Dec. 17, 1957 W. R. SWANSON 2,816,725
FUEL CELL SUPPORTS
Filed Sept. 24, 1954
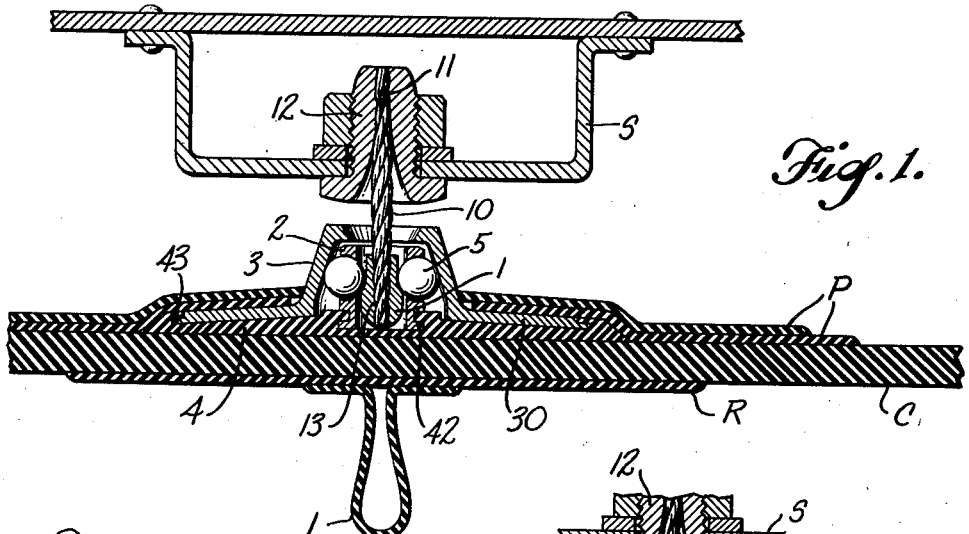
Fig. 1.
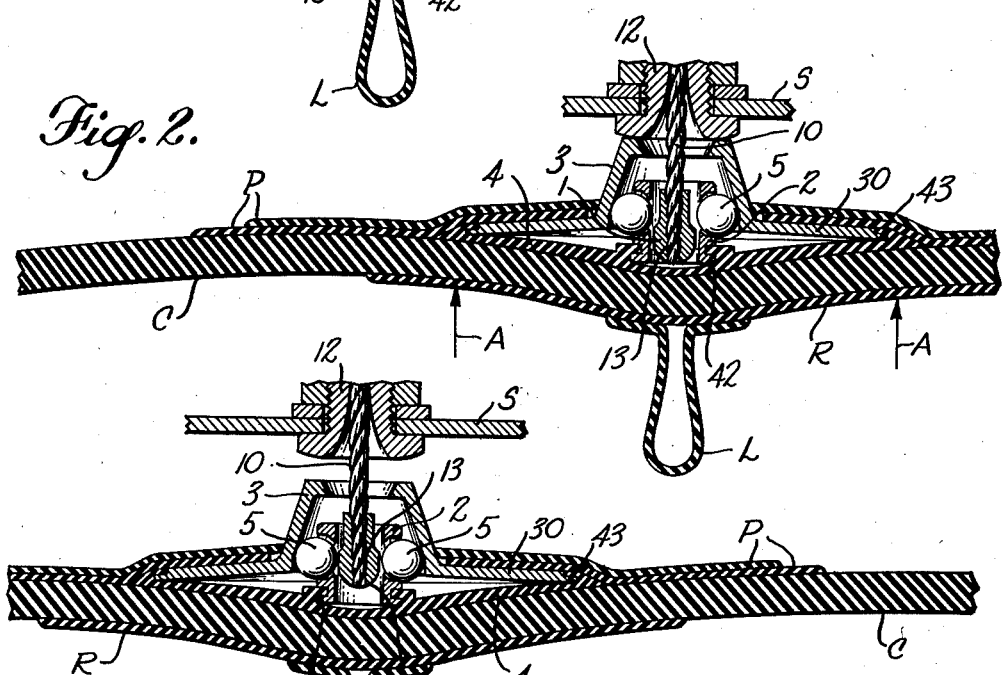
Fig. 2.
Fig. 3.
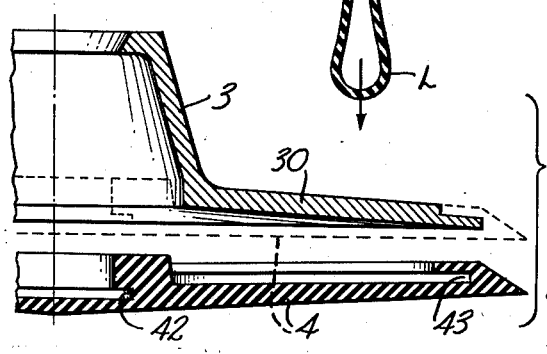
Fig. 4.
INVENTOR.
WALLACE R. SWANSON
BY
Reynolds, Beach & Christensen
ATTORNEYS

United States Patent Office 2,816,725
Patented Dec. 17, 1957

2,816,725

FUEL CELL SUPPORTS

Wallace R. Swanson, Seattle, Wash., assignor to Boeing Airplane Company, Seattle, Wash., a corporation of Delaware Application September 24, 1954, Serial No. 458,109

8 Claims. (Cl. 244—135)

Fuel aboard an airplane is frequently carried in fuel cells made of a rubber-like material. Because of the flexibility of the walls of such cells, they must be supported from the airplane structure at numerous points, yet they should not at such points, nor elsewhere, be permitted to come into contact with the structure, for that would result in chafing and wear. Furthermore, the cells must be removable, when that becomes necessary, and readily replaceable in position, yet the supporting means must insure against accidental disengagement, not only under the influence of expected conditions and forces, but even under abnormal circumstances.

The present invention is designed to effect these purposes, and, more particularly, to provide a fuel cell support incorporating two principal elements, a cell-mounted element and a structure-mounted element, which are provided with means and with parts so arranged that the two are readily connected and disconnected, yet when connected, all forces acting upon the fuel cell, such as negative pressure, fuel sloshing, the fuel's weight, vibration, etc., only serve to enhance the interengagement of the two elements.

Even more specifically, it is the object of this invention to provide a fuel cell connector of the character indicated in which the cell-mounted element is formed with two cooperating parts, so connected by a third part in a unitary assembly that one of the two cooperating parts may move relative to the other, and must be so moved positively for connection to and disconnection from the structure-mounted element, but will be so positioned by inherent stress in the third part (or its elastic resistance to stress) that under all normal circumstances, and even under all abnormal circumstances so far encountered, and in the absence of a positive attempt to disengage, they will not disengage accidentally. The connection is accomplished by a fourth part, the movement of which is accomplished by the relative movement of the two cooperating parts.

It is, of course, an object to provide a fuel cell connector of the character indicated, which shall be simple, relatively inexpensive, and light in weight, besides one which can be positively and securely connected, each element to the fuel cell or to the support, respectively.

With such objects in mind, and others as will appear more fully hereinafter, this invention comprises the novel connector, and the novel relationship of the parts thereof to one another, and to the supporting structure and the supported fuel cell, all as is shown in the accompanying drawings in a typical form, and as will be more fully explained hereinafter, and defined in the claims.

Figure 1 is a sectional view axially of the connector, illustrating the parts in the engaged or cell-supporting position.

Figure 2 is a view similar to Figure 1, but showing parts in the first stage of the process of disengagement, and Figure 3 is a similar view, showing parts in the final stage of the process of disengagement.

Figure 4 is an exploded half sectional view, on an enlarged scale, of two of the cooperating parts of the cell-mounted element of the connector.

The details of the supporting aircraft structure S are immaterial. Only a small portion of the wall C of the fuel cell is illustrated. The structure S would normally be any suitable and suitably located rigid portion of the aircraft structure, and the cell wall C would be flexible, but substantially inelastic.

The two principal elements of the connector comprise the structure-mounted element, consisting primarily of a head 1 and a reduced neck 10 supporting the head at some given spacing from the structure S, and the cell-mounted element, which includes four parts, a sleeve 2, a cooperating housing 3 coaxial with but surrounding the sleeve, a pad 4 of flexible and somewhat elastic material intended for securement over one face to the exterior of the cell wall C, and retaining balls or the like, at 5.

The structure-mounted element must, of course, be provided with means for securing it to the structure in each desired location. To that end, and for a further purpose which will appear shortly, it is convenient to form the neck 10 as a short length of fairly stiff yet somewhat flexible wire cable or the like, and to swage its one end at 13 within the ball-like head 1, and its other end at 11 within an axial bore which is formed directly or indirectly in a hollow bolt 12, arranged for securement in the structure S. The bore of the bolt 12 is formed on a curve of sufficiently large radius that the cable's failure from fatigue is prevented, yet enough larger than the cable 10 that the latter may have some slight degree of flexural movement in all directions. The head 1 is secured on the protruding end of the cable or neck 10 at some distance beyond the end of the bolt 12, for a purpose and to a distance such as will be made clear hereinafter.

The sleeve 2 is primarily a means for supporting, locating, and effecting movement of retaining devices arranged in a circle about the sleeve, which may slip axially past the head 1, and then crowd inwardly behind the head, or past which the head may slip during withdrawal. The precise form of these retainer devices might vary widely, so long as they may move in a general radial direction, but they are conveniently formed as balls 5, which are received in and located by apertures disposed in a circle around the sleeve 2, intermediate its ends, and which are of a size with relation to the diameter of the balls to permit the latter to move outwardly from their head-retaining position shown in Figure 1, far enough to permit passage of the head, as shown in Figure 2, or as they are shown in Figure 3 in the operation of passing the head. The sleeve's bore, as is evident, is large enough to receive the head 1.

In order to prevent the balls from escaping outwardly from the apertures in the sleeve which locates them, and in order to crowd them inwardly when they have passed the head, and yet to permit them to move radially outwardly to pass over the head for disengagement, the housing 3 is interiorly formed conically. In all positions of the connector when assembled, the balls 5 engage the conical interior wall of the housing 3 and are retained thereby in their apertures in the sleeve. The balls may move radially outwardly or are crowded radially inwardly, depending upon whether they are located, by relative axial movement of the sleeve and housing, nearer the larger end of the housing 3 or nearer its smaller end. The smaller end of the housing is apertured, and preferably chamfered, for guidance and entrance of the head 1 as it approaches the bore of the sleeve 2.

The pad 4, preferably made of a rubber composition to be flexible and at least slightly elastic, constitutes the means for mounting the sleeve 2 and the housing 3 in their operative relationship, and for retaining them normally in such relationship. It serves also as the means enabling relative axial movement between the sleeve and the housing. Near its center it is provided with means for interengagement with the sleeve, to support the latter with its axis substantially normal to the general plane of the pad 4 and of the cell wall C to which the pad is to be or has been adhered. Conveniently, the pad may be formed with an inwardly directed groove 42 for interengagement with a complemental outwardly directed groove about the end of the sleeve 2. In similar fashion, and in this instance preferably by providing the pad near its periphery with a similar inwardly facing groove 43, it is interengaged with the periphery of the housing 3, or more properly with the peripheral edge of the flange 30 which is directed outwardly from the housing 3 to a distance outwardly beyond the point of interconnection at 42 between the sleeve and the pad.

The flange 30 and the pad 4 are so formed individually and relatively that upon their interengagement the cell-wall-contacting surface of the pad is substantially planar, and is supported and backed up in this planar disposition. Contrary to normal expectation, this does not involve making the pad on this surface initially planar. Rather, as is shown in Figure 4, the cell-wall-contacting surface of the pad is very slightly but still distinctly flatly conical, or convex, but at the same time the surface of the flange 30 which is to contact the pad 4 is concavely but shallowly dished. The diameter of the pad inside the bottom of the groove 43 might be slightly less than the corresponding diameter of the flange 30, although this is not essential. When assembled by slipping the periphery of the flange 30 inside the groove 43, the pad 4 is sufficiently stressed and stretched that its peripheral groove 43 tends to hug the periphery of the flange 30, and even more importantly, its cell-wall-contacting surface, which when unstressed was flatly conical, is now precisely planar, as shown in dash lines in the upper portion of Figure 4. Furthermore, it is backed in this disposition by the flange 30, the dishing whereof is just sufficient in depth and shape to receive the upwardly urged flat cone of the pad. When so assembled and stretched (the sleeve 2 having first been interengaged with the groove 42, with the balls 5 in place), the cell-mounted element of the connector can be handled as a unit, and secured, over the entire lower face of the pad, to the cell wall. The securement may be by an adhesive or by bonding or vulcanization, or any other suitable and known process.

While theoretically the pad 4 might be thus secured to the cell wall and require no further securement, in practice, it is considered preferable to overlay the flange 30 with adhesively secured or bonded patches P, secured normally to the flange and to the cell wall outwardly beyond the flange. This positively prevents disengagement between the periphery of the flange and its receiving groove 43. The cell wall can also be reenforced from the interior if desired, as indicated by the reenforcement R.

When thus assembled, with the tendency of the pad to lie flat and to fill the slight dishing of the under side of the flange 30, the elasticity of the pad produces a positive tendency to hold the central part of the pad, including the sleeve 2, projected well within the housing 3. In this position of the parts, the engagement of the balls with the smaller end of the conical wall of the housing urges the balls radially inwardly, and if the head 1 has been slipped past the balls into the position shown in Figure 1, this inward urging of the balls engages them behind the head and retains the head against disengagement. Any pull on the cell wall as a whole, or exteriorly of the flange's periphery, such as includes or produces a downward component, merely pulls the housing 3 the more strongly downwardly, and urges the balls the more strongly into their head-retaining position. At such times, there is no downward force active on the sleeve 2, nor is there any way in which such a force can act.

Whenever it is desired to disengage the cell from its support, it is necessary to follow in sequence the two steps illustrated in Figures 2 and 3. First, the housing 3 must be pushed upwardly relative to the sleeve 2 sufficiently that the balls 5 may separate radially. This is possible only because the cable or stem 10, in the normal engaged position of Figure 1, has enough length to space the top of the housing 3 from the end of the bolt 12. The upward pushing of the housing 3, as at A, while the sleeve 2 is held by the finger loop L from rising also, moves the housing 3 axially relative to the sleeve 2 into the position of Figure 2. The balls 5 may now move radially outwardly enough to clear the head 1.

If, however, the upward push A is now relaxed, the resilience of the pad 4 and the stiffness of the cell wall C will immediately move the housing 3 downwardly again relative to the sleeve 2, the balls 5 will be crowded inwardly behind the head, and release will not occur. It is this that insures retention of the connection against any unintentional release.

Having first pushed upwardly on the housing 3 while preventing rising of the sleeve 2, to place parts in the positions shown in Figure 2, the next step for release is to hold the housing and sleeve in their attained axially displaced relationship, while drawing both downwardly, as in Figure 3. This draws the radially separated balls downwardly past the head 1, as in Figure 3, and when the balls are clear of the head the pad 4 may be permitted to relax, and to restore the sleeve to its relationship, as in Figure 1, to the housing.

For reengagement it is in effect only necessary to push upwardly about the margin of the flange 30, as at A, while the head 1 is entered within the sleeve's bore and engaged with the balls. The cable 10 having some appreciable stiffness, reinforced by its bolt 12, pushes the balls 5 downwardly, and through them displaces the sleeve 2 axially downward relative to the upwardly urged housing 3. The balls eventually separate enough for the head to pass, whereupon the pad 4 snaps the sleeve back upwardly, and the balls are crowded inwardly behind the head. Parts are then in the Figure 1 relationship.

The flexible nature of the neck 10 permits the cell to move under the influence of vibration or similar forces, with respect to the structure S, or compensates for minor misalignment of the two matching elements, and yet produces no appreciable stress. The spacing between the cell C and structure S holds them apart to prevent any chafing. Nevertheless, the flexibility of the neck 10 is limited, and limits the amplitude of relative movement between the cell C and structure S.

I claim as my invention:

1. A device for detachably supporting a flexible fuel cell wall or the like from but out of contact with the supporting structure of an airplane or the like, comprising an element for mounting upon such a cell and a complemental element for mounting upon such structure, the structure-mounted element including an attachment means, a head, and a neck supporting said head from said attachment means at a given spacing therefrom; the cell-mounted element including a flexible and somewhat resilient disk-like pad for securement over its one face to the exterior of the cell's wall, a housing interiorly conically tapered, a wide flange directed outwardly from the larger end of the housing, and secured about its periphery, only, to said resilient pad, to prevent their axial separation, but leaving the housing and the interior of its flange free to separate from the interior area of the pad by flexing of the latter, a sleeve-like support within and coaxial with said housing, the end of said support which adjoins the pad being secured to the pad for movement therewith, relative to and axially of the housing, upon flexure of the pad's interior area relative to the flange, and a plurality of retainer devices distributed in a circle about the support's bore, in position to engage the head when the latter is entered within the support, said retainer devices being supported by and protruding radially from and into the bore of said support, for engagement by the conical surface of the housing and behind the head, respectively.

2. A device as in claim 1, wherein the periphery of the flange and the corresponding portion of the pad are complementally formed for interchangement, and the pad and the adjoining end of the support are similarly complementally formed for interengagement.

3. Means for supporting a fuel cell, of the character set forth in claim 1, wherein the neck of the structure-mounted element is flexible, the structure-mounted element also including means to limit the flexibility of said neck.

4. Means for supporting a fuel cell, of the character set forth in claim 2, wherein the pad is so formed, with relation to the housing flange's periphery wherewith it engages, to be stressed by such interengagement to urge the sleeve normally in the sense, relative to the housing, to retain the sleeve and the balls in the head-retaining position.

5. Means for supporting a fuel cell, of the character set forth in claim 2, wherein the housing's flange is concavely dished in its pad-contacting face, and the pad is of a thickness, when received in contact with such dished face, to define a planar cell-engaging face.

6. Means for supporting a fuel cell, of the character set forth in claim 5, characterized in that the pad is formed with its cell-engaging surface convexly dished when unstressed.

7. Means for supporting a fuel cell, of the character set forth in claim 2, wherein the conical housing is formed at its larger end with an outwardly directed flange, and the mounting means includes a flexible and elastic pad for securement over its one surface to the cell wall, said pad being formed, near its center, for interengagement with the adjacent end of the sleeve, and being formed radially outwardly thereof with an inwardly directed groove for reception of the peripheral edge of said flange, the radius of said groove at its bottom being no less than the radius of said flange, whereby the pad is elastically stressed by their interengagement, the pad being formed flatly conical on its cell-wall-contacting face, when unstressed, and being flattened by its stressing upon engagement of the flange within the pad's said groove.

8. Means for supporting a fuel cell, of the character set forth in claim 7, wherein the flange is shallowly concavely dished in its pad-contacting surface, to a depth to receive the flattened central portion of the stressed pad, and to back up the latter in its flatened disposition.

References Cited in the file of this patent

UNITED STATES PATENTS

| 690,659 | Ney | Jan. 7, 1902 |
| 1,471,570 | Peterson | Oct. 23, 1923 |

FOREIGN PATENTS

| 536,788 | Germany | Oct. 27, 1931 |